United States Patent Office 2,909,464
Patented Oct. 20, 1959

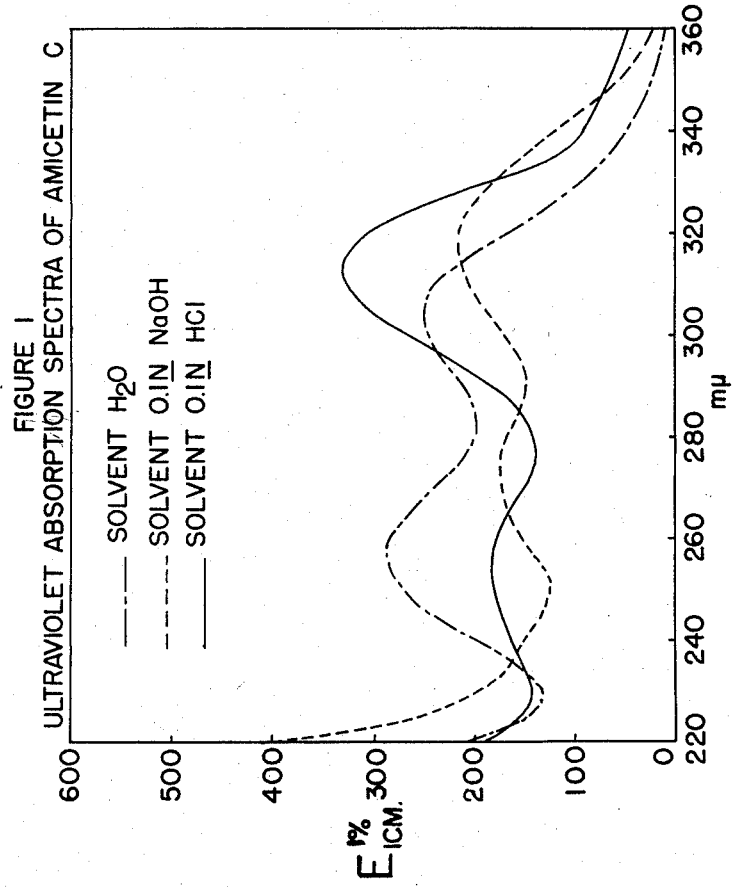

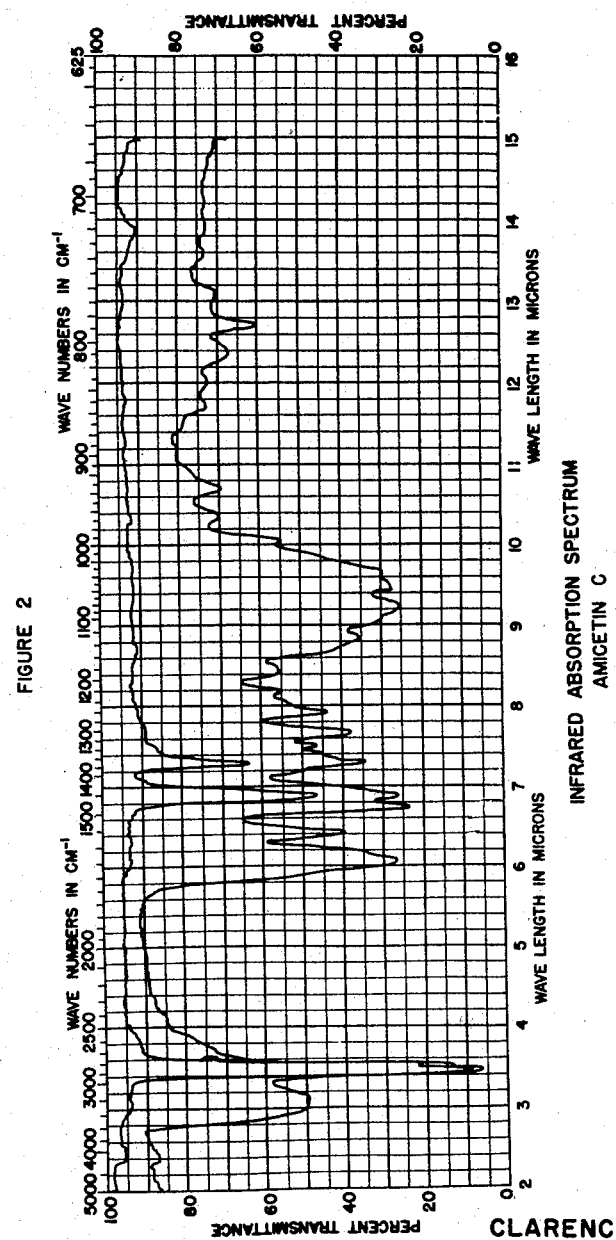

2,909,464

AMICETIN C AND ITS SALTS

Clarence De Boer and Jack W. Hinman, Kalamazoo Township, Kalamazoo County, Mich., assignors to The Upjohn Company, Kalamazoo, Mich., a corporation of Michigan Application August 13, 1953, Serial No. 374,112

5 Claims. (Cl. 167—65)

This invention relates to a new and useful antibiotic substance, amicetin C, obtained by the cultivation of Sterptomyces vinaceus-drappus, a microorganism un-described hitherto.

This application is a continuation-in-part of copending application, Serial No. 238,072, filed July 23, 1951.

It is an object of the present invention to provide a new and useful antibiotic substance possessing bacteriostatic or bacteriocidal activity against certain acid-fast bacteria and more particularly, mycobacteria. Another object of this invention is to provide a substance which is active against gram-negative and gram-positive bacteria. Other objects and features of the invention will be apparent to those skilled in the art to which this invention pertains. The antibiotic of this invention has not yet been proved to have value in human therapy.

It has been found that by cultivating, under controlled conditions, a hitherto undescribed species of microorganism referred to as Streptomyces vinaceus-drappus, a novel antibiotic, amicetin C, is obtained. This microorganism was isolated from a sample of soil taken in Kalamazoo, Michigan. The chosen name of the new microorganism, Streptomyces vinaceus-drappus, characterizes the drab wine color (according to Ridgway, "Color Standards in Nomenclature"), of its aerial mycelium and spores when cultured on a variety of media as set forth below. A culture of the living organism has been deposited with the Fermentation Division of the Northern Regional Research Laboratory at Peoria, Illinois, and has been added to its permanent collection as NRRL 2363.

A careful study of the morphology and physiology of S. vinaceus-drappus showed it to be distinctly different from any previously described species of Streptomyces. The description of the microorganism, according to Bergey's "Manual of Determinative Bacteriology," 6th edition, pages 929 to 933, is given below in Table I, the reported colors being based on Ridgway's "Color Standards in Nomenclature." All seeding was done with a spore suspension, the test tubes containing the various culture media being incubated between 24 and 28 degrees centigrade. Readings were taken on the 4th, 15th, and 22nd days.

S. vinaceus-drappus produces a long, filamentous mycelium which branches profusely, and conidia in sinistrorse spiral chains. The spirals occur singly or in clusters and measure fifteen to twenty microns in length by three to five microns in width. Most of the spirals consist of three to four volutions. The hyphae are approximately 1.0 micron in width while the conidia are between 1.5 and 2.0 microns in diameter.

Although S. vinaceus-drappus is similar in some respects to Streptomyces lavendulae, these microorganisms are readily distinguishable not only by their difference in color (lavender vs. vinaceus-drab) but also by distinct differences in their culture characteristics. These differences are set forth as follows:

| S. lavendulae | S. vinaceous-drappus |
|---|---|
| Brown, water-soluble mycelial pigment. | no mycelial pigment. |
| Color change of gelatin from cream to brown. | no color change of gelatin. |
| Little growth on potato slant—little change in color. | heavy growth on potato slant—vinaceous-drab in color. |
| Oval shaped conidia. | spherical shaped conidia. |

TABLE I

Cultural characteristics of Streptomyces vinaceus-drappus

| Medium | Amount of Growth | Color of Aerial Mycelium and Spores | Soluble Pigment | Remarks |
|---|---|---|---|---|
| Casein Starch agar | Profuse | Light vinaceous drab | None | Colonies flat, smooth, entire. Partial starch hydrolysis. |
| Czapek's-Dox agar | Moderate | Pallid vinaceous drab | do | Cinnamon buff reverse. |
| Irish potato | Heavy | Pale vinaceous drab | do | Rugose surface. Exceptional growth and sporulation. |
| Sweet potato | do | Light vinaceous drab | do | Warty surface. Excellent growth and good sporulation. |
| Nutrient agar | Light | White | do | Chamois reverse. |
| Dextrose agar | Heavy | Quaker drab | do | Blackish-brown (2) reverse. |
| Tyrosine agar | Trace | No sporulation | do | Negative tyrosinase reaction. |
| Calcium malate | Moderate | Pale vinaceous drab | do | |
| Cellulose broth | Light | Pallid vinaceous drab | do | No decomposition of cellulose. |
| Starch agar | Moderate | White | do | Partial hydrolysis. Honey yellow reverse. |
| Nutrient broth | Slight | White-pallid vinaceous drab | do | Vegetative submerged growth. |
| Dextrose broth | Moderate | White | do | Do. |
| Nitrate broth | do | do | do | Reduces nitrates to nitrites. |
| Litmus milk | Light | Pallid vinaceous drab | do | Alkaline reaction, ring-like growth at surface. Gradual reduction, no visible coagulation. |
| Gelatin | do | Ivory | do | Slow liquefaction, pellicle growth. |

The invention is not to be limited to the production of amicetin C by *S. vinaceus-drappus* or to organisms fully answering the above description which is given merely for illustrative purposes only. Other microorganisms, i.e., mutants produced from *S. vinaceus-drappus* by exposure to various mutating agents such as X-radiation, ultraviolet light, high-speed electrons, nitrogen mustards, and the like, can also produce amicetin C.

Amicetin C can be obtained in either the amorphous or crystalline form. Alternatively, amicetin C can be obtained in pure and crystalline form from the amorphous material by using the counter-current distribution technique of Craig, J. Biol. Chem. 155, 519 (1944).

Amicetin C is effective not only against various mycobacteria, notably, *M. tuberculosis* (H37Rv), but it also inhibits the growth of gram-positive bacteria such as *Staphylococcus aureus, Bacillus subtilis*, and the like. The spectrum of amicetin C as compared with other clinically important antibiotics which exhibit anti-tubercular activity is shown below:

ing crystalline amicetin C hydrochloride by careful addition of acetone or a mixture of methanol and acetone. Alternatively, the aqueous solution of the hydrochloride may be freeze-dried and the resulting amorphous solid crystallized from acetone or a mixture of methanol and ether. The crystalline amicetin C hydrochloride is thus obtained in hydrated form. By a similar procedure, other acid salts of amicetin C such as amicetin C sulfate, amicetin C phosphate, amicetin C helianthate, and the like, can be likewise obtained in crystalline form.

The ultraviolet absorption spectrum of anhydrous crystalline amicetin C is shown in Fig. 1. When the spectrum is determined in aqueous solution, maxima of $$E_{1\,cm.}^{1\%} = 288$$

at 257 millimicrons and $$E_{1\,cm.}^{1\%} = 250$$

at 304 millimicrons and minima values of $$E_{1\,cm.}^{1\%} = 132.5$$

TABLE II

*Microgram of antibiotic per milliliter of nutrient broth necessary to inhibit growth of microorganisms*

| Bacteria | Amicetin [1] | Amicetin C | Strepto-mycin | Strepto-thricin | Neomycin | Terra-mycin | Aureo-mycin | Chloram-phenicol |
|---|---|---|---|---|---|---|---|---|
| A. Acid-fast: | | | | | | | | |
| *Mycobacterium tuberculosis v. hominis* (607) | 1.0 | 3-5 | 1.0 | 2.0 | 0.4 | 1.0 | 0.25 | 3.3 |
| *Mycobacterium tuberculosis v. hominis* H37Rv | 0.2-0.5 | 5.0 | 6.25 | 12.5-50 | 6.25-12.5 | 25 | 25-100 | 6.25-12.5 |
| *Mycobacterium avium* | 1.0 | 2.0 | 1.0 | 2.0 | 0.4 | 0.2 | 0.1 | 2.0 |
| B. Gram-positive: | | | | | | | | |
| *Staphylococcus aureus* (FDA-209) | 4.0 | 20 | 0.1 | 0.2 | 0.02 | 1.10 | .13 | 3.3 |
| *Bacillus subtilis* (Ill.) | 4.0 | 20 | 0.4 | 0.4 | 0.01 | 10 | .33 | 1.7 |
| C. Gram-negative: | | | | | | | | |
| *Escherichia coli* (26) | >50 | >50 | 1.0 | 1.0 | 0.1 | 2.5 | 1.0 | 1.7 |
| *Klebsiella pneumoniae* (10031) | 20 | >50 | <0.1 | 0.2 | 0.1 | 1.7 | 0.20 | 1.0 |
| *Pseudomonas aeruginosa* (9027) | >50 | >50 | 1.0 | 2.0 | 0.2 | 17 | 20 | 50 |
| *Salmonella schottmuelleri* (9149) | >50 | >50 | 4.0 | 0.2 | 0.1 | 4.0 | 1.1 | 3.3 |
| *Proteus vulgaris* (8427) | >50 | >50 | 0.2 | 0.1 | 0.1 | 17 | 2.0 | 1.0 |
| *Salmonella typhosa* (167) | 50 | >50 | 1.0 | 0.1 | 0.02 | 2.5 | .67 | 1.2 |

[1] The antibiotic described and claimed in parent copending application Serial No. 238,072, filed July 23, 1951.

An aerosol spray containing amicetin C or a salt thereof as the essential ingredient is useful in hospitals, especially in tuberculosis wards, to prevent or reduce the possibility of transmission of pathogenic organisms such as *M. tuberculosis* (H37Rv), and the like, from patient to patient or from patient to doctor. Likewise, wash solutions containing amicetin C or a salt thereof are also useful for general sanitation purposes, for example, washing of hands and/or cleaning equipment, floors or furnishings in tuberculosis wards and also in laboratories experimenting with mycobacteria.

The toxicity of various antibiotics, including amicetin C, is given in the following table:

TABLE III

*Acute toxicity of antibiotics*

[Mg. per kg., mice.]

| Antibiotic | Intravenous LD$_{50}$ | Subcutaneous LD$_{50}$ | Oral LD$_{50}$ |
|---|---|---|---|
| Streptomycin sulfate | 208 | 720 | >10,000 |
| Neomycin sulfate | 93 | 420 | 2,000-2,500 |
| Aureomycin hydrochloride | 134 | >300 | >2,500 |
| Terramycin | 178 | 800 | 6,700 |
| Netropsin | 17 | 70 | 3,800 |
| Amicetin | 90 | 600-700 | 2,200 |
| Amicetin C | 433 | 438 | |

Amicetin C is a weakly basic compound. The crystalline free base is fairly soluble in distilled water, i.e., at least 10 mgms./ml., and is readily soluble in acid solutions. The crystalline hydrochloride of amicetin C is obtained by dissolving the free base in a dilute hydrochloric acid solution, concentrating the solution to a small volume under reduced pressure and precipitating the resultat 229 millimicrons and $$E_{1\,cm.}^{1\%} = 194.9$$

at 283 millimicrons are observed. When the spectrum is determined using a 0.1 N hydrochloric acid solution, maxima of $$E_{1\,cm.}^{1\%} = 183$$

at 255 millimicrons and $$E_{1\,cm.}^{1\%} = 332$$

at 313 millimicrons and minima of $$E_{1\,cm.}^{1\%} = 141.3$$

at 230 millimicrons and $$E_{1\,cm.}^{1\%} = 138.5$$

at 278 millimicrons are observed. When the spectrum is determined using a 0.1 N sodium hydroxide solution, maxima of $$E_{1\,cm.}^{1\%} = 174$$

at 274 millimicrons and $$E_{1\,cm.}^{1\%} = 217$$

at 318 millimicrons and minima of $$E_{1\,cm.}^{1\%} = 123$$

at 251 millimicrons and $$E_{1\,cm.}^{1\%} = 146$$

at 291.5 millimicrons. The specific rotation of the anhydrous amicetin C in 0.1 N hydrochloric acid at $[\alpha]_D^{23°} - 123.1°$, at a concentration of 0.5 percent.

Figure 2 shows the infrared absorption spectrum made from a suspension of anhydrous crystalline amicetin C, mulled in liquid petrolatum. It shows the following characteristic absorption bands in the infrared, expressed in reciprocal centimeters: 3250, 1660, 1558, 1485, 1334, 1305, 1263, 1222, 1182, 1132, 1083, 1052, 1039, 996, 966, 934, 854, 832, 808, 786, and 753. The individual band at about 3250 is characteristic of the O—H and N—H groups. The bands at 1660 and 1558 are characteristic of the mono-substituted amidecarbonyl groups.

The $R_f$ value of amicetin C (the ratio of movement of the liquid front to the movement of the antibiotic) is about 0.71 when a mixture of ninety percent n-butanol and ten percent water is employed as the developing agent.

Movement of antibiotic substances produced by the fermentation of *S. vinaceus-drappus* was obtained, on paper chromatography, according to the method of Peterson and Reineke, J. Am. Chem. Soc., 72, 3598 (1950), using n-butanol saturated with water.

The properties indicated above clearly show that amicetin C is different from any other known and previously characterized antibiotic material.

In order that the activity of the culture filtrates, extraction fractions, and the crude, purified, or crystalline preparations of amicetin C could be easily and routinely evaluated, an agar plate assay procedure was employed using *M. avium* (7992) as a test organism and pure streptomycin sulfate as the assay standard. An *M. avium* unit of activity (or more simply, a unit of activity) as herein used is defined as an equivalent of one microgram of pure streptomycin free base. The assay procedure is based on that of Loo et al., J. Bact., 50, 701 (1945). The agar medium consists of trypticase soy broth, thirty grams (trypticase is a peptone derived from casein by pancreatic digestion); agar, twenty grams; beef extract 3.0 grams; Tween 80, 0.1 milliliter; and sufficient water to make a volume of one liter. The test solution is applied to ¼-inch filter paper disks (Whatman) and the plates are incubated at 37 degrees centigrade for sixteen to eighteen hours. The range of the assay curve is from 6.25 units per milliliter to 100 units per milliliter.

The following examples illustrate the formation, recovery, concentration, purification, crystallization and identification of amicetin C. These examples are merely illustrative in nature and are not to be construed as limiting.

EXAMPLE 1.—FORMATION AND RECOVERY OF AMICETIN C

To a 500 milliliter Erlenmeyer flask is added 100 milliliters of a seed medium containing the following ingredients:

| | Grams |
|---|---|
| Glucose monohydrate | 10 |
| Difco, bacto-peptone | 5 |
| Difco, beef extract | 10 |
| Sodium chloride | 5 |
| Tap water to 1000 cc. | |

NOTE.—Difco, bacto-peptone is a product of high peptone and amino acid content containing a negligible quantity only of proteoses and complex nitrogenous constituents. Difco, beef extract is a specifically prepared beef extract standardized to give uniform results. It is prepared by cooking waste meat products in water, filtering, and concentrating the filtrate to the consistency of a paste.

The flask and its contents are sterilized by autoclaving for a period of twenty minutes at a temperature of 120 degrees centigrade. After cooling, the flask is inoculated with a loopful of *S. vinaceus-drappus* spore suspension obtained from a nine month old casein-starch agar slant and the inoculated flask is agitated on a reciprocating shaker at the rate of 90 four-inch strokes per minute for a period of 24 hours at a temperature of thirty degrees centigrade.

At the end of this period, 25 milliliters of the vegetative growth thus-obtained is used to inoculate a five gallon sweep-stirrer seed bottle charged with twelve liters of the above-indicated medium. (Prior to inoculation, the container and its contents are sterilized by autoclaving for one hour at a temperature of 120 degrees centigrade.) The inoculated medium is fermented in an air flow of ten liters per minute and at a temperature of 26 degrees centigrade. At the end of a 48 hour period, the fermented material is used to inoculate a 100 gallon tank charged with 240 liters of the following medium:

| | | |
|---|---|---|
| Glucose monohydrate | grams | 25 |
| Soybean meal | do | 25 |
| Pabst yeast (debittered yeast) | do | 5 |
| Sodium chloride | do | 5 |
| Calcium carbonate | do | 2 |
| Cobaltous chloride hydrate | milligrams | 4 |
| Tap water to 1 liter. | | |

The tank is sterilized prior to inoculation by heating for a period of twenty minutes at a temperature of 120 degrees centigrade. The fermentation is conducted at 32 degrees centigrade and the medium aerated at a rate of about 150 cubic feet per hour. The fermentation medium is harvested after a period of 88 hours.

The beer thus-obtained (225 liters) is filtered using ten pounds of Dicalite 4200 (a diatomaceous silica sold by The Great Lakes Carbon Corp., Chicago, Illinois) as the filter aid to yield fifty gallons of a clear beer assaying 115 *M. avium* units per milliliter. The filtered beer is extracted with ⅕ of its volume of n-butanol at a pH of 8.5 into a Podbielniak extractor. The rich butanol extract or the rich butanol fraction is extracted with three 6-liter portions of dilute sulfuric acid to obtain a combined aqueous extract at a pH of two. This extract is adjusted to a pH of seven by the addition of sodium hydroxide solution and freeze-dried to yield 57 grams of powder assaying 220 *M. avium* units per milligram. (Papergram studies indicate that this preparation contains mainly amicetin C and amicetin, i.e., amicetin C.) The resulting material is dissolved in 500 milliliters of 0.5 N hydrochloric acid, the solution is filtered and adjusted to a pH of eight by the addition of sodium hydroxide solution. A mixture containing 200 milliliters of amyl acetate, 100 milliliters of n-butanol and 100 milliliters of water is added to the solution. After stirring and refrigerating overnight, 3.62 grams of crystalline amicetin are removed by filtration. The layers of the two-phase system are separated and the aqueous phase extracted with a total of 375 milliliters of amyl acetate at a pH of 8.5 in a 3-plate pseudo countercurrent extraction [Technique of Organic Chemistry, 3, 185–188 (1950); Ind. and Eng. Chem. 27, 836 (1935)]. The amyl acetate solution is extracted sucessively with 75 milliliters of 0.5 N hydrochloric acid, 0.1 N hydrochloric acid and water, using the pseudo countercurrent method. The combined aqueous solution is adjusted to a pH of 8.5 and extracted again with three 100-milliliter portions of amyl acetate by a pseudo countercurrent extraction procedure. A crystalline material, identified as amicetin, separates and is removed from the solution. The organic extract is subjected to another pseudo countercurrent extraction with fifty milliliter portions of 0.05 N sulfuric acid and water. The combined aqueous extract is adjusted to a pH of 6.5 by the addition of barium hydroxide solution. After removal of the barium sulfate precipitate followed by refrigeration of the filtrate for 48 hours, 8.2 milligrams of a yellow crystalline material is obtained.

The filtrate is extracted with a total of sixty milliliters of amyl acetate in another 3-plate pseudo countercurrent distribution procedure. The solution is successively extracted with fifteen milliliters of 0.5 N sulfuric acid, fifteen milliliters of 0.1 N sulfuric acid and five milliliters of water to yield a combined aqueous solution having a pH of 6.0. Two grams of Darco G–60 is added to the solution, the mixture is stirred for fifteen minutes, adjusted to a pH of 8.4 and then heated at a temperature of 55 degrees centigrade for thirty minutes during which time a heavy oil separates. The supernatant is decanted from the oil, and the oily material is dissolved in a mixture containing 25 milliliters of 0.5 N sulfuric acid and 100 milliliters of water. The solution is adjusted to a pH of 7.1 by the addition of a barium hydroxide solution. The resulting barium sulfate precipitate is removed and the filtrate is freeze-dried. The product is suspended in 250 milliliters of anhydrous ether, shaken from time to time and after a period of three hours, collected on a filter and dried. A yield of 2.72 grams of amicetin C is thus obtained in the form of glossy, pale yellow crystals assaying 666 M. avium units per milligram and melting between 160 and 163 degrees centigrade on a Kofler microhotstage.

The following results are obtained on analysis:

*Analysis.*—Calculated for $C_{56}H_{94}N_{10}O_{19}S$: C, 54.13; H, 7.46; N, 11.28; S, 2.58. Found: C, 54.10, 53.86; H, 7.31, 7.59; N, 11.33, 11.36; S, 2.56, 2.59.

EXAMPLE 2.—EXTRACTION OF AMICETIN C

The *Streptomyces vinaceus-drappus* beer (Example 1), maintained at four degrees centigrade for seventeen days, is adjusted to a pH of 8.4 and then filtered with the aid of Supercel (a diatomaceous earth material sold by Johns-Manville Co.) to obtain seventeen liters of a clear beer assaying 65 M. avium units per milliliter. The clear beer thus-obtained is extracted with amyl acetate into a Podbielniak countercurrent extractor, the beer to solvent ratio being 3.5:1, to obtain 4920 milliliters of extract assaying 46 M. avium units per milliliter. The amyl acetate solution is successively extracted with 750 milliliters of 0.5 N hydrochloric acid and 500 milliliters of water using a two-plate pseudo countercurrent extraction technique to obtain 1320 milliliters of extract assaying 198 M. avium units per milliliter. The acid solution is adjusted to a pH of 8.3 and extracted with 450 milliliters of n-amyl acetate using a three-plate pseudo countercurrent extraction technique to obtain 450 milliliters of extract assaying 270 M. avium units per milliliter. The amyl acetate solution is successively extracted with fifty milliliters 0.5 N sulfuric acid, fifty milliliters of 0.1 N sulfuric acid and fifty milliliters of water. The combined acid extract is adjusted to a pH of 7 with crystalline barium hydroxide and a saturated barium hydroxide solution. After removal of the barium sulfate precipitate, 145 milliliters of the clear filtrate thus-obtained assaying 1125 M. avium units per milliliter is freeze-dried to yield 159 milligrams of a fluffy, pale pink powder assaying 437 M. avium units per milligram.

EXAMPLE 3.—PREPARATION OF THE HYDROCHLORIDE OF AMICETIN C

Two hundred and fifty milligrams of crystalline amicetin C, Example 1, is dissolved in 100 milliliters of 0.05 N hydrochloric acid. The resulting pale yellow solution is filtered and freeze-dried. The dried powder thus-obtained is dissolved in a solution containing ten milliliters of methanol, eight milliliters of water and two milliliters of 0.05 N hydrochloric acid. During the portion-wise addition of 100 milliliters of acetone to the resulting solution, a white crystalline material is formed. After cooling overnight the crystals are collected and recrystallized from a water-methanol mixture. A yield of 220 milligrams of amicetin C hydrochloride is obtained assaying 650 M. avium units per milligram.

It is to be understod that the invention is not to be limited to the exact details of operation or exact compounds shown and described as obvious modifications and equivalents will be apparent to one skilled in the art.

The invention is therefore to be limited only by the scope of the appended claims.

We claim:

1. Amicetin C, a substance characterized by being effective in inhibiting the growth of mycobacteria, capable of forming salts with acids, containing the elements carbon, hydrogen, nitrogen and sulfur, fairly soluble in water, and melting between 160 and 163 degrees centigrade; by having an empirical formula corresponding to the following analysis: C, 54.10; H, 7.31; N, 11.33; S, 2.56; by having an ultra-violet adsorption spectrum in aqueous solution exhibiting maxima of $$E^{1\%}_{1\,cm.} = 289$$

at 257 millimicrons and $$E^{1\%}_{1\,cm.} = 250$$

at 304 millimicrons and minima of $$E^{1\%}_{1\,cm.} = 132.5$$

at 229 millimicrons and $$E^{1\%}_{1\,cm.} = 194.9$$

at 283 millimicrons, and in a 0.1 N hydrochloric acid solution, maxima of $$E^{1\%}_{1\,cm.} = 183$$

at 255 millimicrons and $$E^{1\%}_{1\,cm.} = 332$$

at 313 millimicrons and minima of $$E^{1\%}_{1\,cm.} = 141.3$$

at 230 millimicrons and $$E^{1\%}_{1\,cm.} = 138.5$$

at 278 millimicrons; by exhibiting a characteristic absorption in the infrared region of the spectrum, when suspended in mineral oil, at the following frequencies, expressed in reciprocal centimeters: 3250, 1660, 1558, 1485, 1334, 1305, 1263, 1222, 1182, 1132, 1083, 1052, 1039, 996, 966, 934, 854, 832, 808, 786, and 753; and by having a specific rotation $[\alpha]_D^{23°}$ in 0.1 N HCl of plus 123.1 degrees at a concentration of 0.5 percent.

2. A substance selected from the class consisting of amicetin C as characterized in claim 1 and the acid addition salts thereof.

3. An acid addition salt of amicetin C as characterized in claim 1.

4. The hydrochloride of amicetin C as characterized in claim 1.

5. A composition of matter consisting of amicetin C as characterized in claim 1.

References Cited in the file of this patent

UNITED STATES PATENTS 2,516,080    Sobin _____ July 18, 1950

OTHER REFERENCES

Klarman: Am. J. Pharm., July 1955, pp. 252–255.

Johnson et al.: "Mycomycin," Jour. Bact. 54 (1947), p. 281.

Waksman et al.: Science, March 25, 1949, vol. 109, No. 2830, pp. 305–307.

Robertson et al.: Antibiotics, Lippincott, Philadelphia, 1949, p. 119.

Science News Letter for March 1951, p. 130.

Waksman: The Actinomycetes, pp. 116–117, pub. Chronica Botanica Co., Waltham, Mass., 1950.

Hinman et al.: J.A.C.S., vol. 75, 1953, pp. 499, 500, 5864–5871.

McCormick et al.: Antibiotics and Chemotherapy, July 1953, pp. 718–720.